US012715427B2

(12) United States Patent
Kwak et al.

(10) Patent No.: US 12,715,427 B2
(45) Date of Patent: Aug. 25, 2026

(54) HYBRID CAR AND METHOD FOR CONTROLLING SAME

(71) Applicants: Hyundai Motor Company, Seoul (KR); Kia Corporation, Seoul (KR)

(72) Inventors: Dong Hwan Kwak, Hwaseong-si (KR); Sueng Ho Lee, Seoul (KR); Jeong Mo Jang, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 827 days.

(21) Appl. No.: 17/892,318

(22) Filed: Aug. 22, 2022

(65) Prior Publication Data

US 2023/0322205 A1 Oct. 12, 2023

(30) Foreign Application Priority Data

Apr. 12, 2022 (KR) ........................ 10-2022-0045301

(51) Int. Cl.
*B60W 20/40* (2016.01)
*B60W 10/02* (2006.01)
(Continued)

(52) U.S. Cl.
CPC ............ *B60W 20/40* (2013.01); *B60W 10/06* (2013.01); *F02N 19/005* (2013.01);
(Continued)

(58) Field of Classification Search
CPC ........ B60K 6/387; B60K 6/442; B60K 6/547; B60W 10/026; B60W 10/06; B60W 20/40; B60W 20/50; B60W 2050/0215; B60W 2050/0292; B60W 2420/503; B60W 2510/0685; F02D 2041/227; F02D 35/028; F02D 41/062; F02N 19/005; Y02T 10/62
(Continued)

(56) References Cited

U.S. PATENT DOCUMENTS

2003/0176964 A1 9/2003 Turner et al.
2013/0271051 A1* 10/2013 Goto ..................... B60L 3/0038 318/400.26
2016/0266008 A1 9/2016 Park et al.

FOREIGN PATENT DOCUMENTS

JP 3770235 B2 4/2006
JP 2012-136202 A 7/2012
(Continued)

*Primary Examiner* — Phutthiwat Wongwian
(74) *Attorney, Agent, or Firm* — Morgan, Lewis & Bockius LLP

(57) ABSTRACT

A hybrid vehicle and a method for controlling there same, includes a motor provided with a resolver configured for detecting a first rotation angle of the motor, and connected to a crankshaft of an engine through a predetermined connecting means; a rotation angle sensor configured for detecting a second rotation angle of the engine; and a control unit electrically connected to the rotation angle sensor and configured to determine whether a failure has occurred in the rotation angle sensor, and determine a first rotation angle corresponding to a specific crank position based on a relationship of a previously obtained first rotation angle and the second rotation angle, and a rotation number of the motor when the control unit concludes that the failure has occurred in the rotation angle sensor.

20 Claims, 4 Drawing Sheets

(51) Int. Cl.
*B60W 10/06* (2006.01)
*F02N 19/00* (2010.01)

(52) U.S. Cl.
CPC ..... *B60W 10/026* (2013.01); *B60W 2420/503* (2013.01); *B60W 2510/0685* (2013.01)

(58) Field of Classification Search
USPC .......................................................... 701/701
See application file for complete search history.

(56) References Cited

FOREIGN PATENT DOCUMENTS

| | | | |
|---|---|---|---|
| JP | 2015024734 | * | 2/2015 |
| JP | 6032352 | B2 | 11/2016 |
| JP | WO2014/174679 | A1 | 2/2017 |
| JP | 2021-037822 | A | 3/2021 |
| KR | 10-2019-0057843 | A | 5/2019 |

* cited by examiner

HYBRID CAR AND METHOD FOR CONTROLLING SAME

CROSS-REFERENCE TO RELATED APPLICATION(S)

The present application claims priority to Korean Patent Application No. 10-2022-0045301, filed on Apr. 12, 2022, the entire contents of which is incorporated herein for all purposes by this reference.

BACKGROUND OF THE PRESENT DISCLOSURE

Field of the Present Disclosure

The present disclosure relates to a hybrid vehicle and a method for controlling the same, and more specifically, to a hybrid vehicle and a method for controlling the same, wherein in the case of a failure of a rotation angle sensor configured to detect the rotation angle of an engine in connection with a structure directly connecting the engine and a motor, the current rotation angle of the engine is determined on the basis of the rotation angle of the motor detected by a resolver of the motor such that the engine may be started regardless of the failure of the engine rotation angle sensor, and the vehicle safety is improved.

Description of Related Art

Recently, eco-friendly cars (for example, purely electric cars, hybrid cars, and fuel cell cars) capable of replacing internal combustion engine cars use electric motors to drive the vehicles, and are thus also referred to as motorized vehicles. Hybrid cars, among the same, have both an engine and a motor, and the rotation angle of each needs to be detected for driving control.

A resolver is used as a position sensor for detecting the absolute angle position of the motor rotor. Compared with encoders, resolvers have higher levels of mechanical strength and durability and thus may be used as driving motor position sensors in fields requiring high-performance and high-precision driving (for example, electric cars).

Meanwhile, in the case of a failure of a rotation angle sensor for detecting the engine rotation angle, the position of the crankshaft (for example, top dead point) cannot be measured, causing a problem in that the amount of fuel injected into the engine, the injection timing, and the ignition timing cannot be determined accurately.

Therefore, there is a need for a scheme for detecting the engine rotation angle such that, even in the case of a failure of a rotation angle sensor for detecting the rotation angle of the engine of a hybrid car, the engine may be started identically to an existing system.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid vehicle and a method for controlling the same, wherein in the case of a failure of a rotation angle sensor configured to detect the rotation angle of an engine in connection with a structure directly connecting the engine and a motor, the current rotation angle of the engine is determined on the basis of the rotation angle of the motor detected by a resolver of the motor such that the engine may be started regardless of the failure of the engine rotation angle sensor, and the vehicle safety is improved.

To solve the above-mentioned problems, a hybrid vehicle according to an exemplary embodiment of the present disclosure may include: a motor provided with a resolver configured for detecting a first rotation angle of the motor, and connected to a crankshaft of an engine through a predetermined connecting means; a rotation angle sensor configured for detecting a second rotation angle of the engine; and a control unit electrically connected to the rotation angle sensor and configured to determine whether a failure has occurred in the rotation angle sensor and determine the first rotation angle corresponding to a predetermined crank position based on a relationship of a previously obtained first rotation angle and the second rotation angle, and a rotation number of the motor when the control unit concludes that the failure has occurred in the rotation angle sensor.

The second rotation angle of the engine may be detected through a missing tooth recognition signal of the rotation angle sensor.

The relationship of the first rotation angle and the second rotation angle may be obtained through Equation 1 below, $$\theta_2 = k\theta_1 \quad \text{Equation 1:}$$

(θ1=an amount of variation of the first rotation angle, θ2=an amount of variation of the second rotation angle, and k=a rotation ratio of the motor and the engine by a connecting means).

When the motor is directly connected to a crankshaft of the engine, it is possible that K=1.

The relationship of the first rotation angle and the second rotation angle may include at least one of a first rotation angle of the motor when an engine crank is initially located at a predetermined crank position, a rotation ratio of the motor and the engine according to the predetermined connecting means, and a rotation number of the motor.

The first rotation angle of the motor when an engine crank is initially located at a predetermined crank position and the rotation number of the motor may have a relationship as shown in Equation 2 below, $$\theta_1 = a + 2\pi kn \quad \text{Equation 2:}$$

($\theta_1$=the first rotation angle corresponding to the predetermined crank position, a=a first rotation angle when the engine crank is initially positioned at a top dead point, k=a rotation ratio of the motor and the engine by a connecting means, n=the rotation number of the motor, excluding a rotation number of the motor when the first rotation angle is observed from the final rotation number of the motor).

The control unit may include an engine control unit (ECU), and the relationship of the first rotation angle and the second rotation angle, and the rotation number may be obtained through a motor control unit (MCU).

The predetermined crank position may include a top dead point.

The control unit may control an engine start based on the determined first rotation angle, and may store a final engine crank position value and the rotation number of the motor when the engine is turned off after driving.

When the final engine crank position value and the rotation number of the motor are stored in the control unit, the control unit may determine again whether the failure has occurred in the rotation angle sensor based on the stored final engine crank position value and the rotation number of the motor.

To solve the above-mentioned problems, a method for controlling a hybrid vehicle may include: detecting a first rotation angle of a motor and a second rotation angle of an engine by a resolver and a rotation angle sensor, respectively; determining whether a failure has occurred in the rotation angle sensor by a control unit; and determining, by the control unit, the first rotation angle corresponding to a predetermined crank position based on a relationship of a previously obtained first rotation angle and the second rotation angle, and a rotation number of the motor when the control unit concludes that the failure has occurred in the rotation angle sensor.

The method may further include, after the determining of whether the failure has occurred in the rotation angle sensor by the control unit, obtaining, by the control unit, a relationship of the first rotation angle and the second rotation angle, and the rotation number from a motor control unit (MCU).

The method may further include, after the determining the first rotation angle, controlling, by the control unit, an engine start of the vehicle based on the first rotation angle; and controlling, by the control unit, a final engine crank position value and the rotation number of the motor to be stored in the control unit when the engine is turned off after driving.

The method may further include, after controlling the final engine crank position value and the rotation number of the motor to be stored in the control unit, determining again, by the control unit, whether the failure has occurred in the rotation angle sensor based on the stored final engine crank position value and the rotation number of the motor.

According to a hybrid vehicle and a method for controlling the same according to the present disclosure, in the case of a failure of a rotation angle sensor configured to detect the rotation angle of an engine in connection with a structure directly connecting the engine and a motor, the current rotation angle of the engine may be determined based on the rotation angle of the motor detected by a resolver of the motor so that the engine may be started regardless of the failure of the engine rotation angle sensor, and the vehicle safety is improved. Furthermore, software control logic may be improved so that the present disclosure may be implemented without additional cost increase.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
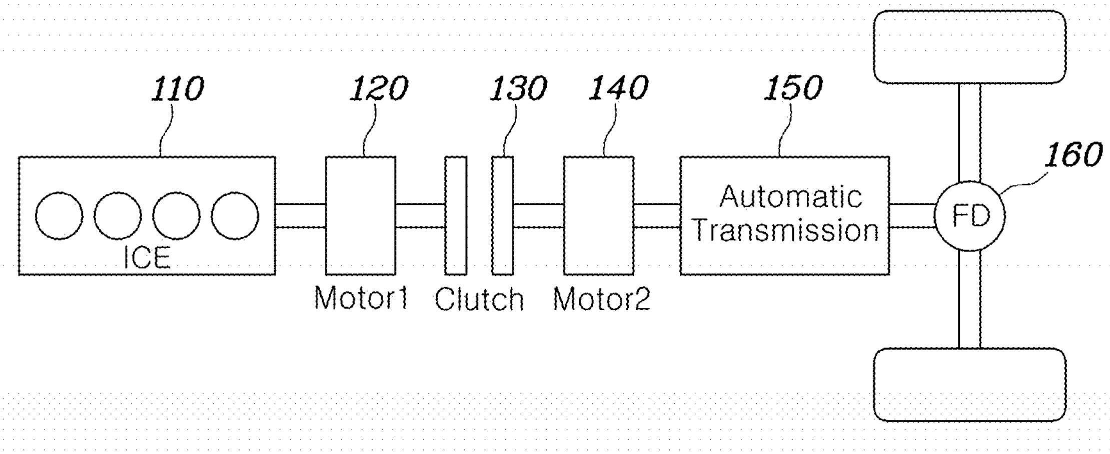
FIG. 1 shows an example of a power train configuration of a hybrid vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to a same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments disclosed in the exemplary embodiment will be described in detail with reference to the accompanying drawings, and a same or similar elements are given a same and similar reference numerals, so duplicate descriptions thereof will be omitted. The terms “module” and “unit” used for the elements in the following description are given or interchangeably used in consideration of only the ease of writing the specification, and do not have distinct meanings or roles by themselves. Furthermore, in relation to describing the exemplary embodiments disclosed in the exemplary embodiment, when the detailed description of the relevant known technology is determined to unnecessarily obscure the gist of the present disclosure, the detailed description may be omitted. Furthermore, the accompanying drawings are provided only for easy understanding of the exemplary embodiments disclosed in the exemplary embodiment, and the technical spirit disclosed herein is not limited to the accompanying drawings, and it should be understood that all changes, equivalents, or substitutes thereof are included in the spirit and scope of the present disclosure.

Terms including an ordinal number such as “first”, “second”, or the like may be used to describe various elements, but the elements are not limited to the terms. The above terms are used only for distinguishing one element from another element.

In the case where an element is referred to as being “connected” or “coupled” to any other element, it should be understood that another element may be provided therebetween, as well as that the element may be directly connected or coupled to the other element. In contrast, in the case where an element is “directly connected” or “directly coupled” to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but does not mean a generic function unit. For example, in order to control a function that a control unit is responsible for, each control unit may include a communication device configured to communicate with a sensor or another control unit, a memory configured to store an operation system, a logic command, or input/output information, and at least one processor configured to perform determination, calculation, decision or the like which are required for responsible function controlling.

Before describing a method of controlling a hybrid vehicle according to various exemplary embodiments of the present disclosure, a control system and a structure of a hybrid vehicle applicable to the exemplary embodiments will be first described.

FIG. 1 shows an example of a power train configuration of a hybrid vehicle according to an exemplary embodiment of the present disclosure.

FIG. 1 show a power train of a hybrid vehicle employing a parallel-type hybrid system in which two motors 120 and 140 and an engine clutch 130 are mounted between an engine 110 (an internal combustion engine (ICE)) and a transmission 150. The parallel-type hybrid system has the motor 140 continuously connected to an input terminal of the transmission 150, and thus may be called a transmission mounted electric drive (TMED) hybrid system.

In here, a first motor 120 of the two motors 120 and 140 may be provided between the engine 110 and one end portion of the engine clutch 130 and an engine shaft of the engine 110 and a first motor shaft of the first motor 120 may be directly connected to each other to continuously rotate together.

One end portion of a second motor shaft of a second motor 140 may be connected to the other end portion the engine clutch 130 and the other end portion of the second motor shaft may be connected to an input terminal of the transmission 150.

The second motor 140 may have a larger output compared to the first motor 120 and the second motor 140 may function as a driving motor. Furthermore, the first motor 120 may function as a starter motor configured to crank the engine 110 when the engine 110 is starting, recover rotation energy of the engine 110 through power generation when the engine is turned off, and perform power generation with power of the engine 110 when the engine 110 is driven.

In the hybrid vehicle including the power train shown in FIG. 1, when a driver steps on an accelerator after start (for example, HEV ready), the second motor 140 may be driven by use of power of a battery first in a state in which the engine clutch 130 is opened. Accordingly, wheels are moved by the power of the second motor 140 having passed the transmission 150 and a final drive (FD) 160 (that is, EV mode). When the vehicle is slowly accelerated and needs more power, the first motor 120 operates to crank the engine 110.

When a rotation speed difference between the engine 110 and the second motor 140 after the engine 110 is started falls within a predetermined range, then the engine clutch 130 is engaged so that the engine 110 and the second motor 140 rotate together (that is, transition from an EV mode to a HEV mode). Accordingly, through a torque blending process, the output of the second motor 140 decreases and the output of the engine 110 increases, thus satisfying a required torque of a driver. In the HEV mode, the engine 110 may satisfy most of the required torque, and the difference between the engine torque and the required torque may be compensated with one of the first motor 120 and the second motor 140. For example, when the engine 110 outputs a toque higher than the required torque considering efficiency of the engine 110, the first motor 120 or the second motor 140 may generate power by the engine torque surplus, and when the engine torque is insufficient than the required torque, at least one of the first motor 120 and the second motor 140 outputs the insufficient torque.

When a predetermined off condition such as speed reduction of a vehicle is satisfied, the engine clutch 130 is opened and the engine 110 is stopped (that is, transition from the HEV mode to the EV mode). The battery is charged through the second motor 140 by use of driving force of the wheel when decelerating, and this is called braking energy regeneration or regenerative braking.

Generally, step-variable transmission, a multidisc clutch, or, for example, a dual clutch transmission may be used for transmission 150.

Figure 2:
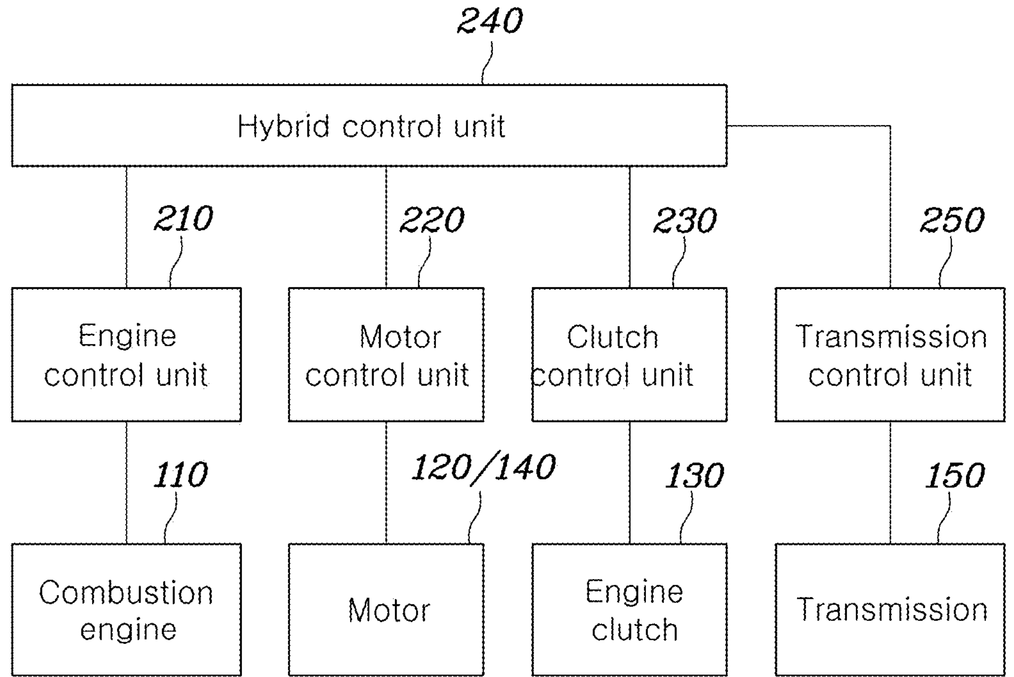
FIG. 2 shows an example of a control system configuration of a hybrid vehicle according to an exemplary embodiment of the present disclosure.

FIG. 2 shows an example of a control system configuration of a hybrid vehicle according to an exemplary embodiment of the present disclosure.

Referring to FIG. 2, in the hybrid vehicle to which embodiments of the present disclosure is applied, an internal combustion engine 110 may be controlled by an engine control unit 210, a torque of the first motor 120 and the second motor 140 may be controlled by a motor control unit 220 (MCU), and the engine clutch 130 may be controlled by a clutch control unit 230.

In here, the engine control unit 210 may be also referred to as an engine management system (EMS). The engine control unit 210 may use rotation angle information detected by a rotation angle sensor in determining a fuel injection amount, injection timing, and ignition timing of the engine 110.

Furthermore, the transmission control unit 250 may control the transmission 150.

The motor control unit 220 may control a gate drive unit by a control signal in a pulse width modulation form based on a motor angle, phase voltage, phase current, required torque, or the like of each motor 120 and 140, and the gate drive unit may control an inverter for driving each motor 120 and 140 according thereto. In here, the motor control unit 220 may obtain motor angle (or rotation angle) information through a resolver included in each motor 120 and 140.

Each control unit may be connected to a hybrid control unit 240 which is an upper control unit and controls overall power train, including a mode switching process so that each control unit may provide, to the hybrid control unit 240, information required for control of the engine clutch during driving mode change according to the control of the hybrid control unit 240 or shifting gears, and/or information required for engine stop control, or may perform an operation according to a control signal.

For example, the hybrid control unit 240 may determine whether to perform a transition between EV-HEV modes or Charge Depleting (CD)-Charge Sustaining (CS) modes (in case of plug-in hybrid electric vehicle (PHEV)) according to driving condition of the vehicle. To the present end, the hybrid control unit may determine an open time point of the engine clutch 130 and perform a hydraulic control when the clutch is open. Furthermore, the hybrid control unit 240 may determine a state (lock-up, slip, open, etc.) of the engine clutch 130 and control a fuel injection stopping time point of the engine 110. Furthermore, the hybrid control unit may transfer, to the motor control unit 220, a torque command for controlling a torque of the first motor 120 for the engine stopping control, to control engine rotation energy recovery. The hybrid control unit 240 may determine conditions of each driving source 110, 120, and 140 for satisfying the required torque, determine required driving force to be shared by each driving source 110, 120, and 140, and transfer a torque command to the control unit 210 and 220 controlling each driving source.

Of course, it is apparent to a person skilled in the art that a connection relationship between the control units and the functions/division of the control units are illustrative and the names of the control units may be changed. For example, the hybrid control unit 240 may be implemented such that the functions thereof are provided by any one of the control units other than the hybrid control unit or such that the functions thereof are distributed and provided by two or more of the other control units.

The configuration of FIG. 1 and FIG. 2 is merely a configurational example of a hybrid vehicle and a hybrid vehicle applicable to an exemplary embodiment of the present disclosure is not limited to the configuration. For example, although it has been described that the first motor 120 and the engine 110 are directly connected to each other in FIG. 1, according to another exemplary embodiment of the present disclosure, the first motor 120 and the engine 110 may be connected to each other by use of a predetermined connecting means such as a pulley and belt.

In an exemplary embodiment of the present disclosure, a fail-safe logic is provided, which realizes a virtual rotation angle sensor through a resolver of a motor connected to the engine 110 to determine a current rotation angle of the engine 110 when a failure has occurred in a sensor configured for detecting a rotation angle of the engine 110 of the hybrid car.

In a description below, for convenience, a rotation angle of the motor which is detected by a resolver will be referred to as a first rotation angle and a rotation angle of the engine 110 which is detected by a rotation angle sensor may be referred to as a second rotation angle to be distinguished.

The engine control unit 210 may determine a fuel injection amount, fuel injection timing, and ignition timing of the engine 110 based on the second rotation angle when the crank of the engine 110 is located at a top dead point. Here, the top dead point indicates a position at which a piston is located when the piston is closest to a cylinder head in a cylinder and may mean a point at which a piston of a multi-cylinder engine 110 rises to its highest point.

Figure 3:
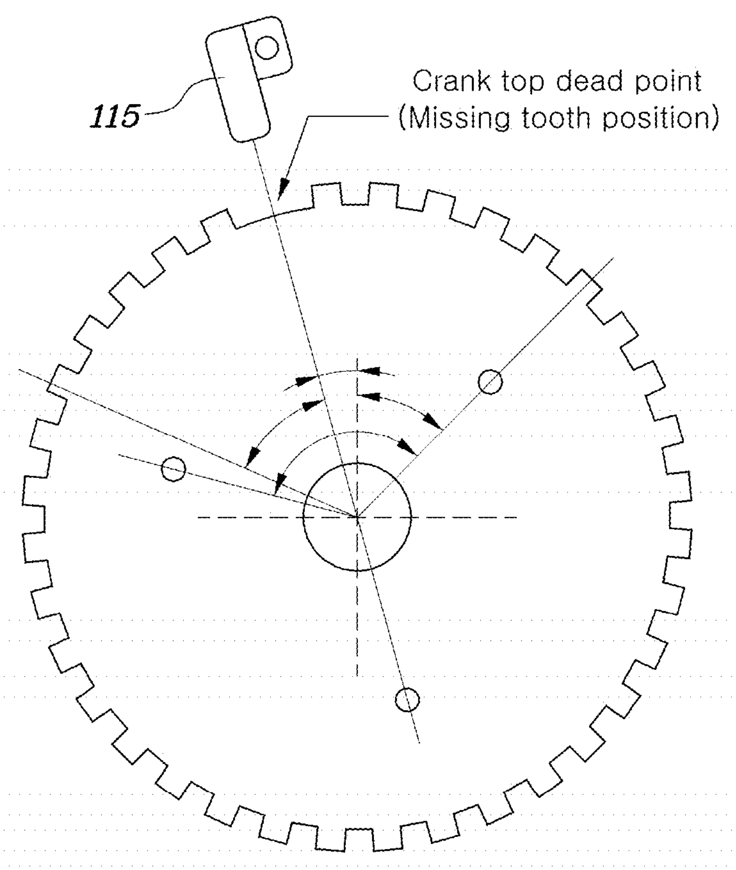
FIG. 3 shows an example of a method for detecting a second rotation angle when an engine crank is positioned at a top dead point, through a missing tooth recognition signal of a rotation angle sensor forming a hybrid car.
Figure 4:
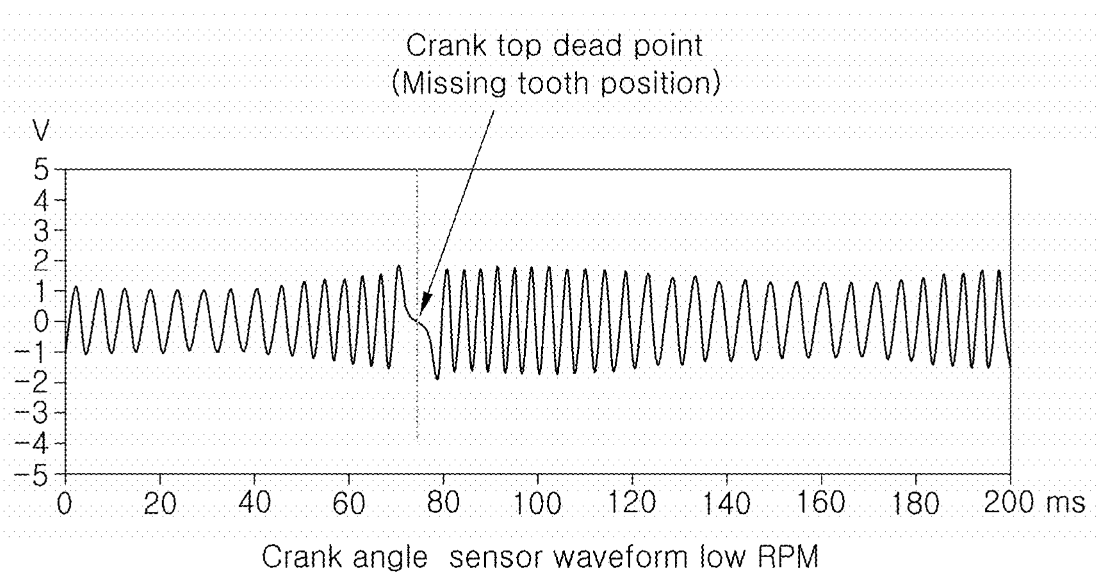
FIG. 4 shows a missing tooth recognition signal graph of a rotation angle sensor according to FIG. 3.

The rotation angle sensor 115 may detect a rotation angle of the engine 110 when the crank of the engine 110 is located at the top dead point through a missing tooth recognition signal. The missing tooth is a tooth for detecting a crankshaft rotation angle or rotation position of the engine 110 and may repeatedly detect the top dead point by recognizing a specific point of the crank as shown in FIG. 3. The second rotation angle detection signal of the rotation angle sensor may have a discontinuous waveform at a missing tooth recognition point as shown in FIG. 4. Accordingly, the engine control unit 210 may determine a point at which a discontinuous waveform is detected as a missing tooth recognition point.

Hereinafter, a relationship of the first rotation angle and the second rotation angle and a control unit for determining the first rotation angle corresponding to a specific crank position based on a rotation number will be described. In a description below, for convenience, the control unit may be assumed as the engine control unit 210, but this is illustrative and not necessarily limited thereto.

First, a relationship of the first rotation angle and the second rotation angle will be described.

$$\theta_2 = k\theta_1 \qquad \text{Equation 1:}$$

($\theta_1$=an amount of variation of the first rotation angle, $\theta_2$=an amount of variation of the second rotation angle, and k=a rotation ratio of the motor and the engine by a connecting means)

Referring Equation 1, when a rotation ratio of the motor and the engine 110 by a connecting means is different, a relationship of the amount of variation of the first rotation angle and the amount of variation of the second rotation angle may have a relationship of $\theta_2=k\theta_1$ ($k\neq 1$). For example, in a connection structure in which the motor and the engine 110 are connected through a pulley and a belt rather than a structure in which the motor and the engine 110 are directly connected to each other, the rotation ratio of the motor and the engine 110 may not correspond to 1. On the other hand, when the motor and the engine 110 are directly connected through a crankshaft, the rotation ratio of motor and the engine 110 by a connecting means corresponds to 1 and thus $\theta_2=\theta_1$ is valid.

Meanwhile, in case that an initial angle of the motor resolver may be identified when the crank is at the top dead point, it may be determined whether the crank becomes the top dead point at which first rotation angle after n-th rotation of the motor as shown in Equation 2.

$$\theta_1 = a + 2\pi kn \qquad \text{Equation 2:}$$

($\theta_1$=a first rotation angle corresponding to a specific crank position, a=a first rotation angle when the engine crank is initially positioned at a top dead point, k=a rotation ratio of the motor and the engine by a connecting means, n=the rotation number of the motor, excluding a rotation number of the motor when the first rotation angle is observed from the final rotation number of the motor)

Referring to Equation 2, expressing the relationship between a first rotation angle of the motor and the rotation number of the motor in the radian unit system, a first rotation angle $\theta_1$ corresponding to a crank top dead point after n-th rotation of the motor may be simulated as a value in which a value obtained by multiplying a rotation ratio of the motor and the engine 110 through a connecting means by a rotation angle $2\pi$ n according to the rotation number (n) of the motor and then summing with a first rotation angle (a) of the motor when the engine 110 crank is initially at the top dead point.

When Equation 1 and Equation 2 are applied to the hybrid vehicle shown in FIG. 1, the first motor 120 and the engine 110 are directly connected and thus k=1. In the instant case, Equation 1 may be represented as "$\theta_2=\theta_1$", and Equation 2 may be represented as "$\theta_1$=a". Here, a relationship of a resolver signal and a crank top dead point may be as shown in FIG. 5.

Figure 5:
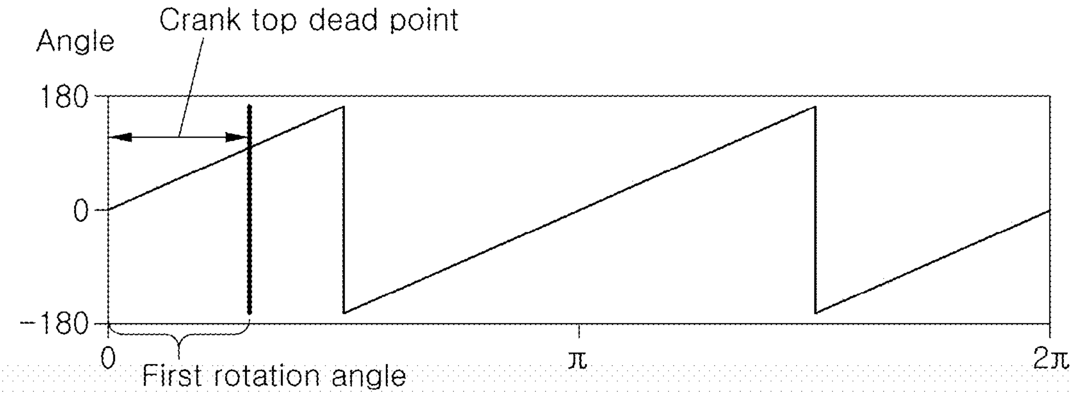
FIG. 5 shows a graph representing a first rotation angle recognition signal of a motor through a resolver.

FIG. 5 shows a graph representing a first rotation angle recognition signal of the motor through a resolver. The engine 110 and the motor are directly connected and thus a missing tooth recognition point in FIG. 4, that is, a second rotation angle at a crank top dead point may match a specific first rotation angle detected through a resolver.

Next, a specific method for determining a rotation angle of the motor by a control unit when a failure has occurred in a rotation angle sensor, based on the above-described rotation numbers and a relationship of the first rotation angle and the second rotation angle will be described. For convenience of description, it is assumed that "k=1".

Firstly, when a vehicle is started for the first time, a rotation number of the motor is zero, a first rotation angle of the motor is 0 degrees, and a rotation number of the engine 110 is zero. After the vehicle have traveled a certain distance, the rotation number (n) of the motor corresponds to 50 million times, and the first rotation angle $\theta_1$ indicates 25 degrees. Here, the engine 110 has rotated 50 million times, and a current second rotation angle of the engine 110 may be 25 degrees according to Equation $\theta_2=\theta_1=a+2\pi k$ n.

Secondly, when a rotation number of the motor is zero and a first rotation angle of the motor is 15 degrees at the time in which a vehicle is started for the first time, a crank is located at the top dead point. Accordingly, when the engine 110 crank is initially located at the top dead point, the first rotation angle (a) of the motor becomes 15 degrees. In case that the rotation number (n) of the motor corresponds to 5000 times after the vehicle have traveled a certain distance, a point where the first rotation angle $\theta_1$ of the motor corresponds to 15 degrees according to Equation $\theta_1=a+2\pi k$ n corresponds to the top dead point of the engine 110 crank.

Thirdly, it is assumed that a relationship of the first rotation angle and the second rotation angle is $\theta_2=k\theta_1$ (k=1.12) according to a structure in which the motor and the engine 110 are connected through a pulley and a belt rather than a structure in which the motor and the engine 110 are directly connected. When a rotation number of the motor is zero and a first rotation angle of the motor is 15 degrees at the time in which the vehicle is started for the first time, the crank is located at the top dead point. Accordingly, when the engine 110 crank is initially located at the top dead point, the first rotation angle (a) of the motor becomes 15 degrees. In case that the rotation number (n) of the motor corresponds to 5000 times after the vehicle have traveled a certain distance, a point where a=15, k=1.12, n=5000, $\theta_1$=15 degrees according to Equation $\theta_1=a+2\pi k$ n corresponds to the top dead point of the engine 110 crank. In the same manner, in case that the rotation number (n') of the motor corresponds to 5001 times, a point where the first rotation angle $\theta_1$ of the motor corresponds to 42.2 degrees may be determined as a next top dead point.

Furthermore, the control unit may determine a first rotation angle corresponding to the next top dead point and determine a second rotation angle on the basis thereof.

Figure 6:
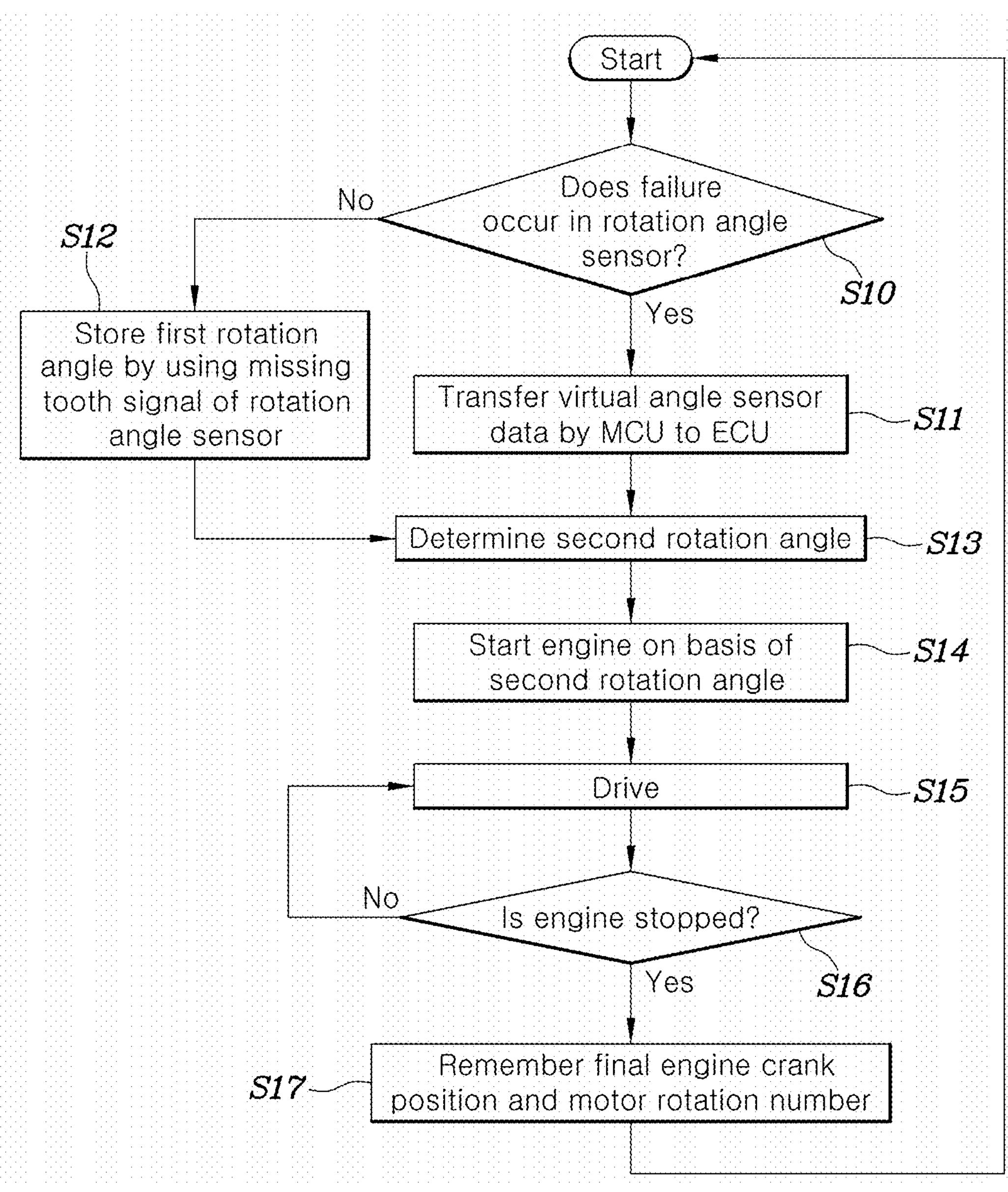
FIG. 6 shows a flowchart of operating a method for controlling a hybrid vehicle of the present disclosure.

The above-described method for determining a rotation angle of the engine 110 is summarized in a flowchart as shown in FIG. 6.

FIG. 6 shows a flowchart of operating a method for controlling a hybrid vehicle of the present disclosure. FIG. 6 shows a flowchart according to a fail-safe logic which realizes a virtual rotation angle sensor through a resolver of a motor to determine a current rotation angle of the engine 110.

First, a control unit may determine whether a failure has occurred in a rotation angle sensor (S10). If it is determined that a failure has not occurred in the rotation angle sensor (NO in S10), a first rotation angle may be stored by use of a missing tooth signal of the rotation angle sensor (S12). This value may correspond to the first ration angle (that is, "a" in Equation 2) of the motor when the engine crank is initially positioned at the top dead point.

However, when it is determined that a failure has occurred in the rotation angle sensor (YES in S10), a virtual rotation angle sensor is realized based on a relationship of the previously obtained first rotation and a second rotation angle (that is Equation 1 and Equation 2) and a final engine crank position memorized (corresponding to operation S17 to be described below) lastly from a previous drive, and the rotation number of the motor to determine the first rotation angle corresponding to a specific crank position (for example, a top dead point) and through this, the second rotation angle may be determined (S13).

Here, the determination of the second rotation angle by the control unit (S13) may include obtaining the relationship of the first rotation angle and the second rotation angle and the rotation number from a motor control unit (MCU).

Furthermore, the relationship of the first rotation angle and the second rotation angle may be obtained through the first rotation angle of the motor when the engine 110 crank is initially located at a specific crank position, a rotation ratio of the motor and the engine 110 according to a predetermined connecting means, and the rotation number of the motor.

As described above, the relationship of the first rotation angle and the second rotation angle may be identified with reference to Equation 1, and it may be identified whether the crank becomes the top dead point at which first rotation angle after n-th rotation of the motor with reference to Equation 2, in case that an initial angle of the motor resolver may be identified when the crank is at the top dead point. In a same manner, when Equation 1 and Equation 2 are applied to the hybrid vehicle shown in FIG. 1, the first motor 120 and the engine 110 are directly connected and thus it is assumed that k=1.

On the other hand, when a failure has not occurred in the rotation angle sensor (NO in S10), the second rotation angle may be directly determined by the rotation angle sensor (S13).

After the operation (S13) of determining the second rotation angle by the control unit, the engine 110 start of the vehicle is controlled based on the determined second rotation angle of the engine 110 to start to drive (S15).

Thereafter, the control unit is configured to store the final engine crank position value and the rotation number of the motor (S17) for determination of the first rotation angle corresponding to the next top dead point in preparation for failure of the engine rotation angle sensor when the engine 110 is turned off (YES in S16), and causes a top dead point position of the engine 110 crank to be simulated based on the stored final engine crank position value and the rotation number of the motor.

Here, the final engine crank position value stored in the control unit may include the second rotation angle of the engine 110 detected by the rotation angle sensor and may include all information by which the engine 110 crank position is identified, but the second rotation angle information is merely illustrative without limitation thereto.

Thereafter, when the final engine crank position value and the rotation number of the motor are stored (S17) in the control unit, the control unit may determine (S13) the first rotation angle corresponding to the top dead point based on the stored final engine crank position value and the rotation number of the motor in case of a failure of the rotation angle sensor (YES in S10).

The present disclosure as described above may be implemented as codes in a computer-readable medium in which a program is recorded. The computer-readable medium includes all types of recording devices in which data readable by a computer system are stored. Examples of the computer-readable medium include a Hard Disk Drive (HDD), a solid state disk (SSD), a silicon disk drive (SDD), a ROM, a RAM, a CD-ROM, a magnetic tape, a floppy disk, an optical data storage device, and the like. Furthermore, the above detailed description may not be construed in a limitative sense, but should be considered in an illustrative sense in all aspects. The scope of the present disclosure should not be determined by reasonable interpretation of the appended claims, and all changes and modifications within the equivalent scope of the present disclosure fall within the scope of the present disclosure.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A hybrid vehicle comprising:
a motor provided with a resolver configured for detecting a first rotation angle of the motor, and connected to a crankshaft of an engine;
a rotation angle sensor configured for detecting a second rotation angle of the engine; and
a control unit electrically connected to the rotation angle sensor and configured to;
determine whether a failure has occurred in the rotation angle sensor; and
determine, in response that the control unit concludes that the failure has occurred in the rotation angle sensor, the first rotation angle corresponding to a predetermined crank position based on (i) a relationship of a previously obtained first rotation angle and the second rotation angle, and (ii) a rotation number of the motor after the control unit determines that the failure has occurred.

2. The hybrid vehicle of claim 1,
wherein the second rotation angle of the engine is detected through a missing tooth recognition signal of the rotation angle sensor.

3. The hybrid vehicle of claim 1,
wherein the relationship of the previously obtained first rotation angle and the second rotation angle is obtained through Equation 1 below, $$\theta_2 = k\theta_1 \quad \text{Equation 1:}$$

wherein θ1 is an amount of variation of the first rotation angle, θ2 is an amount of variation of the second rotation angle, and k is a rotation ratio of the motor and the engine.

4. The hybrid vehicle of claim 3,
wherein when the motor is directly connected to a crankshaft of the engine, the k is equal to 1.

5. The hybrid vehicle of claim 1,
wherein the relationship of the previously obtained first rotation angle and the second rotation angle includes at least one of the previously obtained first rotation angle of the motor when an engine crank is initially located at the predetermined crank position, a rotation ratio of the motor and the engine, and the rotation number of the motor.

6. The hybrid vehicle of claim 5,
wherein the first rotation angle of the motor when the engine crank is initially located at the predetermined crank position and the rotation number of the motor have a relationship as shown in Equation 2 below, $$\theta_1 = a + 2\pi k\, n \quad \text{Equation 2:}$$

wherein $\theta_1$ is the first rotation angle corresponding to the predetermined crank position, a is a first rotation angle when the engine crank is initially positioned at a top dead point, k is the rotation ratio of the motor and the engine, n is the rotation number of the motor, excluding a rotation number of the motor when the first rotation angle is observed from a final rotation number of the motor.

7. The hybrid vehicle of claim 1,
wherein the control unit includes an engine control unit (ECU), and
wherein the relationship of the previously obtained first rotation angle and the second rotation angle, and the rotation number of the motor are obtained through a motor control unit (MCU).

8. The hybrid vehicle of claim 1,
wherein the predetermined crank position includes a top dead point.

9. The hybrid vehicle of claim 1,
wherein the control unit is configured to control an engine start based on the determined first rotation angle, and
wherein the control unit is configured to store a final engine crank position value and a rotation number of the motor when the engine is turned off after driving.

10. The hybrid vehicle of claim 9,
wherein when the final engine crank position value and the rotation number of the motor are stored in the control unit, the control unit is configured to determine again whether the failure has occurred in the rotation angle sensor based on the stored final engine crank position value and the rotation number of the motor.

11. A method for controlling a hybrid vehicle, the method comprising:

detecting a first rotation angle of a motor and a second rotation angle of an engine by a resolver and a rotation angle sensor, respectively;

determining, by a control unit, whether a failure has occurred in the rotation angle sensor; and determining, by the control unit, in response that the control unit concludes that the failure has occurred in the rotation angle sensor, the first rotation angle corresponding to a predetermined crank position based on (i) a relationship of a previously obtained first rotation angle and the second rotation angle, and (ii) a rotation number of the motor after the control unit determines that the failure has occurred.

12. The method of claim 11, wherein the second rotation angle of the engine is detected through a missing tooth recognition signal of the rotation angle sensor.

13. The method of claim 11, further including:

after the determining of whether the failure has occurred in the rotation angle sensor by the control unit, obtaining, by the control unit, the relationship of the previously obtained first rotation angle and the second rotation angle, and the rotation number from a motor control unit (MCU).

14. The method of claim 11, further including:

after the determining the first rotation angle, controlling, by the control unit, an engine start of the vehicle based on the determined first rotation angle.

15. The method of claim 14, further including:

after controlling the final engine crank position value and the rotation number of the motor to be stored in the control unit, determining again, by the control unit, whether the failure has occurred in the rotation angle sensor based on the stored final engine crank position value and the rotation number of the motor.

16. The method of claim 15, wherein the control unit is configured to store a final engine crank position value and the rotation number of the motor when the engine is turned off after driving.

17. The method of claim 11, wherein the predetermined crank position includes a top dead point.

18. The method of claim 11, wherein the relationship of the previously obtained first rotation angle and the second rotation angle is obtained through Equation 1 below, $$\theta_2 = k\theta_1 \quad \text{Equation 1:}$$

wherein θ1 is an amount of variation of the first rotation angle, θ2 is an amount of variation of the second rotation angle, and k is a rotation ratio of the motor and the engine, and wherein when the motor is directly connected to a crankshaft of the engine, the k is equal to 1.

19. The method of claim 11, wherein the relationship of the previously obtained first rotation angle and the second rotation angle includes at least one of the previously obtained first rotation angle of the motor when an engine crank is initially located at the predetermined crank position, a rotation ratio of the motor and the engine, and the rotation number of the motor.

20. The method of claim 19, wherein the first rotation angle of the motor when the engine crank is initially located at the predetermined crank position and the rotation number of the motor have a relationship as shown in Equation 2 below, $$\theta_1 = a + 2\pi k\, n \quad \text{Equation 2:}$$

wherein $\theta_1$ is the first rotation angle corresponding to the predetermined crank position, a is a first rotation angle when the engine crank is initially positioned at a top dead point, k is the rotation ratio of the motor and the engine, n is the rotation number of the motor, excluding a rotation number of the motor when the first rotation angle is observed from a final rotation number of the motor.

* * * * *